(12) United States Patent
Hultell et al.

(10) Patent No.: US 8,483,302 B2
(45) Date of Patent: Jul. 9, 2013

(54) METHODS AND DEVICES FOR CARRIER ACTIVATION/DEACTIVATION IN A MULTI-CARRIER COMMUNICATION SYSTEM

(75) Inventors: Johan Hultell, Solna (SE); Johan Mikael Bergman, Stockholm (SE); Erik Larsson, Uppasala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 226 days.

(21) Appl. No.: 13/049,186

(22) Filed: Mar. 16, 2011

(65) Prior Publication Data

US 2011/0243264 A1 Oct. 6, 2011

Related U.S. Application Data

(60) Provisional application No. 61/319,462, filed on Mar. 31, 2010.

(30) Foreign Application Priority Data

Mar. 9, 2011 (WO) .................. PCT/SE2011/050259

(51) Int. Cl.
*H04L 27/28* (2006.01)
(52) U.S. Cl.
USPC ............ 375/260; 370/329; 370/252; 455/450
(58) Field of Classification Search
CPC ....... H04L 5/0098; H04L 5/003; H04L 5/0094; H04L 1/028; H04L 1/1614
USPC .......... 375/260, 267; 370/329, 252; 455/450
See application file for complete search history.

(56) References Cited

U.S. PATENT DOCUMENTS

2009/0080506 A1* 3/2009 Banna et al. .................. 375/230
2009/0316575 A1* 12/2009 Gholmieh et al. ............ 370/225
2010/0130219 A1* 5/2010 Cave et al. .................... 455/450

OTHER PUBLICATIONS

3rd Generation Partnership Project. "HS-SCCH Order Mapping Scheme for 4-carrier HSDPA." 3GPP TSG RAN WG1 Meeting #60, R1-101036, San Francisco, USA, Feb. 22-26, 2010.
3rd Generation Partnership Project. "HS-SCCH Orders for 4C-HSDPA." 3GPP TSG RAN WG1 Meeting #60bis, R1-101797, Beijing, China, Apr. 12-16, 2010.
3rd Generation Partnership Project. "HS-SCCH Orders for Activation and De-Activation of Secondary Carriers in 4C-HSDPA." 3GPP TSG RAN WG1 Meeting #60, R1-101329, San Francisco, USA, Feb. 22-26, 2010.

* cited by examiner

*Primary Examiner* — Sophia Vlahos
(74) *Attorney, Agent, or Firm* — Coats & Bennett, P.L.L.C.

(57) ABSTRACT

The present invention relates to methods and devices for use in multi carrier communication systems in which secondary downlink and secondary uplink carriers may be dynamically activated/deactivated by means of transmitting an HS-SCCH order from a radio base station to a user equipment. The HS-SCCH order is encoded by the radio base station according to an order mapping. The order mapping maps a desired activation status of a set of carriers to a corresponding encoded HS-SCCH order. The user equipment interprets the encoded HS-SCCH order to derive the desired activation status of the set of carriers. By using an appropriate order mapping, operations in the radio base station and/or the user equipment may be simplified, e.g. by allowing the radio base station to calculate the encoded HS-SCCH order based on the desired activation status.

26 Claims, 3 Drawing Sheets

METHODS AND DEVICES FOR CARRIER ACTIVATION/DEACTIVATION IN A MULTI-CARRIER COMMUNICATION SYSTEM

RELATED APPLICATIONS

This application claims priority to U.S. Provisional Patent Application No. 61/319,462, which was filed Mar. 31, 2010, and International Application No. PCT/SE2011/050259, which was filed on Mar. 9, 2011, both of which are incorporated by reference herein in their entirety.

TECHNICAL FIELD

The present invention relates to a multi-carrier communication system and in particular to methods and devices for carrier activation/deactivation in the multi-carrier communication system.

BACKGROUND

There is a continuous development of new generations of mobile communications technologies to cope with increasing requirements of higher data rates, improved efficiency and lower costs. High Speed Downlink Packet Access (HSDPA) and High Speed Uplink Packet Access (HSUPA), together referred to as High Speed Packet Access (HSPA), are mobile communication protocols that were developed to cope with higher data rates than original Wideband Code Division Multiple Access (WCDMA) protocols were capable of. The 3rd Generation Partnership Project (3GPP) is a standards-developing organization that is continuing its work of evolving HSPA and creating new standards that allow for even higher data rates and improved functionality.

In a radio access network implementing HSPA, a user equipment (UE) is wirelessly connected to a radio base station (RBS) commonly referred to as a NodeB (NB). A radio base station is a general term for a radio network node capable of transmitting radio signals to a user equipment (UE) and/or receive signals transmitted by a user equipment (UE).

In multi-cell HSPA (MC-HSPA) systems a NodeB, alternatively referred to as a radio base station (RBS), can schedule downlink transmission to one user equipment (UE) on a plurality of downlink carriers simultaneously. MC-HSPA is sometimes alternatively referred to as multi-carrier HSPA. Multiple uplink carriers may also be activated. Carriers that can be dynamically activated/deactivated are referred to as secondary carriers. A secondary carrier may be secondary downlink carrier or a secondary uplink carrier. The uplink and downlink carriers that cannot be deactivated are referred to as primary or anchor carriers. In 3GPP specifications a secondary downlink carrier is also referred to as a secondary serving HS-DSCH (High-Speed Downlink Shared Channel) cell and a secondary uplink carrier is also referred to as a secondary uplink frequency.

Currently 3GPP is standardizing 4-carrier high speed downlink packet access (4-carrier HSDPA for short) within the scope of Rel-10 (Release 10). 4-carrier HSDPA is an evolution of Dual Cell HSDPA (DC-HSDPA) standardized in Rel-8, Dual-Band DC-HSDPA and DC-HSDPA with Multiple-Input Multiple-Output (MIMO), both standardized in Rel-9. With 4-carrier HSDPA the NodeB can schedule downlink transmission to one UE on up to four downlink carriers simultaneously.

One of the important features in MC-HSPA systems is the serving NodeB's ability to dynamically determine which of the downlink carriers that a certain UE needs to listen to and which uplink carriers that a UE should transmit physical control channels and potentially payload data on.

In the 3GPP standard Technical Specification (TS) 25.212, version 9.1.0, Mutiplexing and channel coding (FDD) dynamic NodeB initiated activation and deactivation of secondary carriers is accomplished by means of High-Speed Shared Control Channel (HS-SCCH) orders. An HS-SCCH order carries the following information:

order type information (3 bits), denoted $x_{odt,1}$, $x_{odt,2}$ and $x_{odt,3}$, order bits information (3 bits), denoted $x_{ord,1}$, $x_{ord,2}$ and $x_{ord,3}$, UE identity, which is based on HS-DSCH Radio Network Identifier (H-RNTI) (16 bits).

An order mapping defines the relationship between the desired outcome of the order and the order type and order bits that are transmitted to the UE. For example, the order type '000' refers to DRX (Discontinuous Reception), DTX (Discontinuous Transmission), and HS-SCCH-less operation.

In MC-HSDPA systems dynamic deactivation of downlink carriers may be initiated due to several reasons. Examples include:

Improve the downlink performance of the primary downlink carrier by allowing the UE to reduce the bandwidth of its receiver filter.

Improve the UE battery life time by allowing the UE to turn off one receiver chain, e.g. in a case of Dual-Band HSDPA.

Reduce uplink overhead and/or improve uplink coverage by enabling the UE to utilize a different format for a High-Speed Dedicated Physical Control Channel (HS-DPCCH), the uplink channel used for HSDPA-related feedback from the UE to the serving NodeB.

Similarly dynamic deactivation of uplink carriers in MC-HSUPA system could be initiated with the objective to:

Improve uplink coverage of, e.g. HS-DPCCH by not requiring the UE to transmit DPCCH on both uplink carriers.

Reduce hardware resource allocation in the Node-B, which is applicable to both serving and non-serving Node-Bs.

Improve radio resource utilization efficiency when multiple active UEs with data to transmit are present in the cell.

An obvious reason for activating a secondary uplink or downlink carrier for a certain UE is to increase the instantaneous data rate.

In 4-carrier HSDPA there will be up to 4 downlink carriers that can be assigned to the same UE and up to 2 adjacent uplink carriers. The design of the HS-SCCH order mappings for 4-carrier HSDPA is currently being discussed in 3GPP and several order mappings have been proposed. Most of the proposed solutions address both 4-carrier HSDPA as described above and a scenario, potentially standardized in a future release, with up to 4 uplink carriers as well. In the proposed solutions both the NodeB and the UE would need to implement a lookup table in which a desired carrier activation status, i.e., a description of the secondary uplink and downlink carriers that should be active after successful HS-SCCH order reception, can be looked up. In a worst case scenario, the desired carrier activation status would however need to be compared with all possible carrier activation statuses listed in the lookup table before the corresponding HS-SCCH order can be determined.

Up to Rel-9 there are in total three HS-SCCH orders related to activation and deactivation of the secondary downlink and/or secondary uplink carrier. This small number of HS-SCCH orders facilitates solutions solely based on look-up tables. For 4-carrier HSDPA, with up to four downlink carriers and up to two uplink carriers configured, a total of twelve HS-SCCH orders related to carrier activation and deactivation, including the three specified in Rel-8 and Rel-9, will be possible. In a potential future release where UEs can be configured with four downlink and four uplink carriers the number of HS-SCCH orders related to the activation and deactivation will be as high as 27, including the three specified in Rel-8 and Rel-9. For such a large number of orders, solutions in which the NodeB and UE need to implement lookup tables and search through a large search space for determining which order that corresponds to a certain activation status of the secondary uplink and downlink carrier(s) may become inefficient. Hence it would be desirable to adopt an order mapping in which the Node-B and UE not necessarily need to rely on pure table lookup solutions.

SUMMARY

An object of the present invention is to provide methods and devices that allow for carrier activation/deactivation.

The above stated object is achieved by means of methods, user equipments and radio base stations according to the independent claims.

A first embodiment provides a method in a radio base station for signal interaction with a user equipment configured for multi carrier operation on a set of carriers including two or three secondary downlink carriers. The method comprises a step of encoding a High-Speed Shared Control Channel, HS-SCCH, order comprising order type bits and order bits. The method also comprises a further step of transmitting the encoded HS-SCCH order to the user equipment. The order type bits and order bits are encoded such that the order type bits and order bits are computable from a decimal-to-binary conversion of a function of a variable V, wherein V is a function of a desired activation status of the secondary downlink carriers and of any secondary uplink carrier of the set of carriers. The desired activation status of a secondary carrier is represented by 1 if the secondary carrier is activated for the user equipment and represented by 0 if the secondary carrier is not activated or not configured for the user equipment.

A second embodiment provides a method in a radio base station for signal interaction with a user equipment configured for multi carrier operation on a set of carriers including two or three secondary downlink carriers. The method comprises a step of encoding a HS-SCCH order comprising three order type bits $x_{odt,1}$, $x_{odt,2}$ and $x_{odt,3}$, and three order bits $x_{ord,1}$, $x_{ord,2}$ and $x_{ord,3}$. The method also comprises a further step of transmitting the encoded HS-SCCH order to the user equipment. The three order type bits and the three order bits are encoded according to an order mapping in accordance with a table:

| Carrier activation status | | | | | | HS-SCCH order | | | | | |
| --- | --- | --- | --- | --- | --- | --- | --- | --- | --- | --- | --- |
| | | | | | | Order type bits | | | Order bits | | |
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 0 | 0 | 0 | 0 | 0 | 0 | 0 | 0 | 1 | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 1 | 0 | 0 | 0 | | | | 1 | 1 | 1 |
| 1 | 0 | 1 | 0 | 0 | 1 | 0 | 1 | 0 | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 | where
$D_k=1$ indicates that secondary downlink carrier k is activated for the user equipment, $D_k=0$ indicates that secondary downlink carrier k is not activated or not configured for the user equipment, $U_l=1$ indicates that secondary uplink carrier l is activated for the user equipment, and $U_l=0$ indicates that secondary uplink carrier l is not activated or not configured for the user equipment.

A third embodiment provides a method in a user equipment for signal interaction with a radio base station. The user equipment is configured for multi carrier operation on a set of carriers including two or three secondary downlink carriers. The method includes a step of receiving a HS-SCCH order from the radio base station. The HS-SCCH order comprises order type bits and order bits, which are encoded such that the order type bits and order bits are computable from a decimal-to-binary conversion of a function of a variable V, wherein V is a function of a desired activation status of the secondary downlink carriers and of any secondary uplink carrier of the set of carriers. The method also comprises a step of interpreting the received HS-SCCH order to identify the desired activation status of the set of carriers.

A fourth embodiment provides a method in a user equipment for signal interaction with a radio base station. The user equipment is configured for multi carrier operation on a set of carriers including two or three secondary downlink carriers. The method comprises a step of receiving a HS-SCCH order from the radio base station. The HS-SCCH order comprises three order type bits $x_{odt,1}$, $x_{odt,2}$ and $x_{odt,3}$, and three order bits $x_{ord,1}$, $x_{ord,2}$ and $x_{ord,3}$. The three order type bits and the three order bits are encoded according to an order mapping in accordance with a table:

| Carrier activation status | | | | | | HS-SCCH order | | | | | |
| --- | --- | --- | --- | --- | --- | --- | --- | --- | --- | --- | --- |
| | | | | | | Order type bits | | | Order bits | | |
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 0 | 0 | 0 | 0 | 0 | 0 | 0 | 0 | 1 | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 1 | 0 | 0 | 0 | | | | 1 | 1 | 1 |
| 1 | 0 | 1 | 0 | 0 | 1 | 0 | 1 | 0 | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 |

The method also comprises a step of interpreting the received HS-SCCH order to identify the desired activation status of the set of carriers.

A fifth embodiment provides a radio base station for signal interaction with a user equipment configured for multi carrier operation on a set of carriers including two or three secondary downlink carriers. The radio base station comprises digital data processing circuitry for encoding a HS-SCCH order comprising order type bits and order bits. The radio base station also comprises a transmitter for transmitting the encoded HS-SCCH order to the user equipment. The digital data processing circuitry is adapted to encode the order type bits and order bits such that the order type bits and order bits are computable from a decimal-to-binary conversion of a function of a variable V, wherein V is a function of a desired activation status of the secondary downlink carriers and of any secondary uplink carrier of the set of carriers.

A sixth embodiment provides a radio base station for signal interaction with a user equipment configured for multi carrier operation on a set of carriers including two or three secondary downlink carriers. The radio base station comprises digital data processing circuitry for encoding a HS-SCCH order comprising three order type bits $x_{odt,1}$, $x_{odt,2}$ and $x_{odt,3}$, and three order bits $x_{ord,1}$, $x_{ord,2}$ and $x_{ord,3}$. The radio base station also comprises a transmitter for transmitting the encoded HS-SCCH order to the user equipment. The digital data processing circuitry is adapted to encode the order type bits and order bits according to an order mapping in accordance with a table:

| Carrier activation status | | | | | | HS-SCCH order | | | | | |
|---|---|---|---|---|---|---|---|---|---|---|---|
| | | | | | | Order type bits | | | Order bits | | |
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 0 | 0 | 0 | 0 | 0 | 0 | | 001 | | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 1 | 0 | 0 | 0 | | | | 1 | 1 | 1 |
| 1 | 0 | 1 | 0 | 0 | 1 | | 010 | | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 |

A seventh embodiment provides a user equipment, which is configurable for multi carrier operation on a set of carriers including two or three secondary downlink carriers. The user equipment includes a radio transmitter, a radio receiver and digital data processing circuitry. The radio receiver is adapted to receive a HS-SCCH order from a radio base station. The HS-SCCH order comprises order type bits and order bits. The order type bits and order bits are encoded such that the order type bits and order bits are computable from a decimal-to-binary conversion of a function of a variable V, wherein V is a function of a desired activation status of the secondary downlink carriers and of any secondary uplink carrier of the set of carriers. The digital data processing circuitry is adapted to interpret the received HS-SCCH order to identify the desired activation status of the set of carriers.

An eighth embodiment provides a user equipment, which is configurable for multi carrier operation on a set of carriers including two or three secondary downlink carriers. The user equipment includes a radio transmitter, a radio receiver and digital data processing circuitry. The radio receiver is adapted to receive a HS-SCCH order from a radio base station. The HS-SCCH order comprises three order type bits $x_{odt,1}$, $x_{odt,2}$ and $x_{odt,3}$, and three order bits $x_{ord,1}$, $x_{ord,2}$ and $x_{ord,3}$, which order type bits and order bits are encoded according to an order mapping in accordance with a table:

| Carrier activation status | | | | | | HS-SCCH order | | | | | |
|---|---|---|---|---|---|---|---|---|---|---|---|
| | | | | | | Order type bits | | | Order bits | | |
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 0 | 0 | 0 | 0 | 0 | 0 | | 001 | | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 1 | 0 | 0 | 0 | | | | 1 | 1 | 1 |
| 1 | 0 | 1 | 0 | 0 | 1 | | 010 | | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 |

The digital data processing circuitry is adapted to interpret the received HS-SCCH order to identify the desired activation status of the set of carriers.

Advantages and further features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Figure 1A:
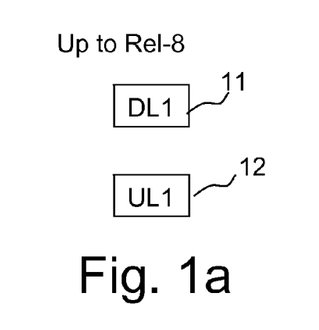
FIGS. 1a-e are schematic block diagrams illustrating carrier configurations supported by different 3GPP standard releases and a potential future release respectively.
Figure 1B:
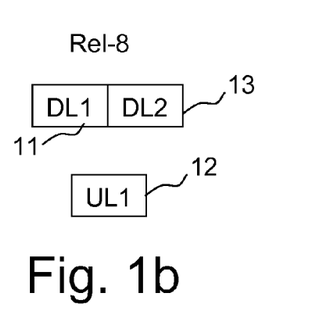
Figure 1C:
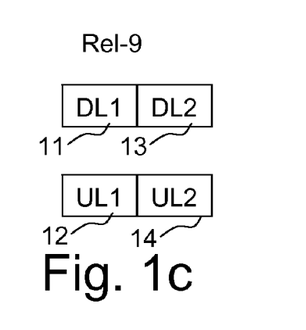
Figure 1D:
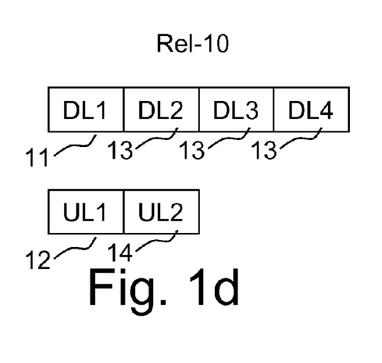
Figure 1E:
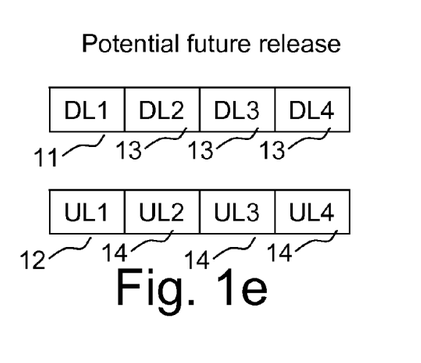

As mentioned above different 3GPP releases support different HSPA carrier configurations. FIG. 1a illustrates the configuration supported up to 3GPP Rel-8, with a single downlink carrier i.e. a primary downlink carrier 11 and a single uplink carrier i.e. a primary uplink carrier 12. 3GPP Rel-8 supports two downlink carriers, the primary downlink carrier 11 and a secondary downlink carrier 13, but only a single uplink carrier i.e. the primary uplink carrier 12 as illustrated in FIG. 1b. FIG. 1c illustrates the supported configuration in 3GPP Rel-9 with up to two downlink carriers 11, 13 and two uplink carriers i.e. the primary uplink carrier 12 and a secondary uplink carrier 14. Unlike 3GPP Rel-8 the downlink carriers can in 3GPP Rel-9 also be configured in multiple-input multiple-output (MIMO) transmission mode. According to 3GPP Rel-10, up to four downlink carriers 11, 13 and two uplink carriers 12, 14 will be supported, which is illustrated in FIG. 1d. It is expected that potential future 3GPP releases will provide support for four downlink carriers 11, 13 and four uplink carriers 12, 14 as illustrated in FIG. 1e.

Figure 2:
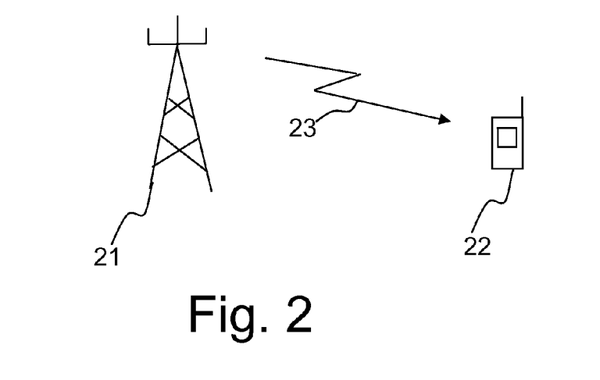
FIG. 2 is a schematic block diagram illustrating transmission of an HS-SCCH order from a serving NodeB to a UE.

FIG. 2 illustrates transmission of an HS-SCCH order 23 for carrier activation/deactivation from a serving Node B 21 to a UE 22. HS-SCCH ordered activation and deactivation of the secondary downlink carrier was introduced in DC-HSDPA according to 3GPP Rel-8 as mentioned above. HS-SCCH ordered activation and deactivation of the secondary uplink carrier was introduced in Rel-9, Dual Cell HSUPA (DC-HSUPA). More specifically, in 3GPP Rel-8 and Rel-9 the order type '001' is used to indicate HS-SCCH orders related to activation or deactivation of a secondary carrier and the order bit $x_{ord,3}$ refers to the activation status of the secondary downlink. Similarly, the order bit $x_{ord,2}$ denotes the activation status of the secondary uplink carrier according to 3GPP Rel-9. Note also that in DC-HSUPA according to Rel-9 all active uplink carriers need to have a corresponding active downlink carrier. Thus the order bits $x_{ord,1}x_{ord,2}x_{ord,3}$=x10 are reserved in Rel-9. In 4-carrier HSDPA there is a restriction that mandates that each active uplink carrier has corresponding active secondary downlink carrier, as in Rel-9.

Embodiments described herein use an HS-SCCH order mapping that enables a NodeB to compute the order type and order bits based on the desired activation status of the configured secondary downlink and secondary uplink carriers.

Figure 3:
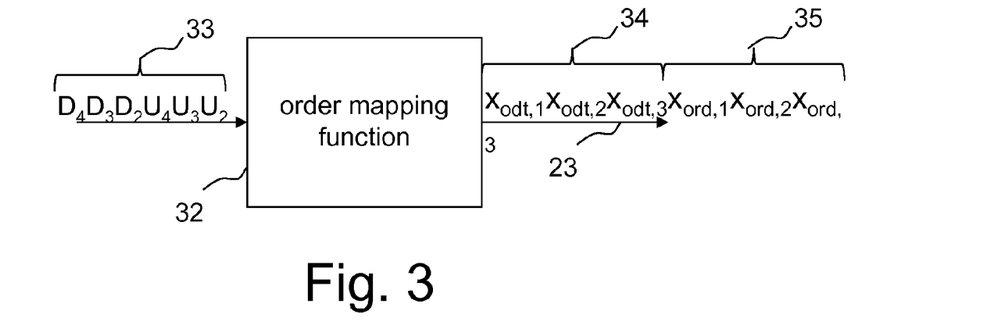
FIG. 3 is a schematic block diagram illustrating an order mapping function in a NodeB.

FIG. 3 is a schematic block diagram illustrating an order mapping function 32 in a NodeB. A desired activation status 33 for a set of carriers is input to the order mapping function. In FIG. 3 it is assumed that the desired activation status 33 is indicated for three secondary downlink carriers and three secondary uplink carriers. However, the desired activation status 33 may indicate a desired status for fewer or more secondary carriers depending on the number of secondary carriers that are configured. The order mapping function maps the desired activation status 33 to the corresponding HS-SCCH order 23, which is the output of the order mapping function as illustrated in FIG. 3. FIG. 3 also illustrates that the HS-SCCH order 23 comprises order type bits 34 and order bits 35. Currently the 3GPP standard specifies three order type bits and three order bits in an HS-SCCH order for carrier activation/deactivation. However it is possible that a different number of order type bits 34 or order bits 35 will be used and/or that the name of the corresponding bits is changed in future standard releases.

FIG. 3 illustrates the order mapping function of the NodeB. The UE will also require an order mapping function, but one that does the reverse operation compared to the order mapping function of the NodeB. Accordingly the order mapping function of the UE maps a received HS-SCCH order 23 to the corresponding desired activation status 33.

Certain embodiments use an HS-SCCH order mapping that has the following characteristics:

Backward compatibility with the activation/deactivation orders introduced in Rel-8 and Rel-9 is retained.

The order types and order bits used for 4-carrier HSDPA are consecutive, i.e. the used order type and order bits for activation and deactivation orders range from $x_{odt,1}x_{odt,2}x_{odt,3},x_{ord,1}x_{ord,2}x_{ord,3}$='000000' to '010011'.

Forward compatibility with a scenario where up to 4 downlink carriers and up to 4 uplink carriers are configured is possible and the mapping ensures that HS-SCCH orders are consecutive (i.e., they range from $x_{odt,1}x_{odt,2}x_{odt,3},x_{ord,1}x_{ord,2}x_{ord,3}$='000000' to '100010').

Upon receiving the HS-SCCH order the UE can utilize information conveyed in the HS-SCCH order as a pointer for finding the information describing the corresponding activation status of the configured carriers.

According to one alternative, the order mapping presented in Table 1 below is used for 4-carrier HSPDA, where up to 4 downlink carriers can be configured and up to 2 uplink carriers can be configured.

HS-SCCH order mappings for a potential future release in which up to 4 downlink carriers can be configured simultaneously as 4 uplink carriers are configured are presented in Table 2. Note that the order mappings presented in Table 1 arise as a subset of those presented in Table 2.

An advantage of the HS-SCCH order mappings presented in Table 1 and Table 2, is that an entity, such as the NodeB or the UE, can determine the order mapping by first computing a variable $$V=(D_2+U_2)+3D_3+6(U_4+D_4)+15U_3-9U_3U_4+(1-D_4)(1-U_3)(D_3+D_2U_2-D_3U_2-D_3D_2)(-1+D_2+U_2)$$

where $D_k$ and $U_l$ represent the desired activation status of downlink and uplink carrier k, 1 for activated and 0 for not activated or not configured. For 4-carrier HSDPA in Rel-10, $U_3=U_4=0$ since only one secondary uplink carrier is supported and $U_3$ and $U_4$ are thus not configured. Note also that $D_k$ and $U_l$ k=2, 3, 4, l=2, 3, 4 represents the activation status of the secondary downlink and uplink carriers. These carriers can be dynamically activated or deactivated with HS-SCCH orders, whereas the primary carriers $D_1$ and $U_1$ always are active, i.e. $D_1=U_1=1$. The order type and order bits are then obtained as the 6 least significant bits according to the following equation:

$$x_{ord}=(x_{odt,1},x_{odt,2},x_{odt,3},x_{ord,1},x_{ord,2},x_{ord,3})=\text{dec2bin}(V+8),\qquad\text{Eq. 2}$$

where dec2bin represents decimal-to-binary conversion.

Based on the equations Eq. 1 and Eq. 2, Table 1 and Table 2 can be created. Accordingly the order mapping function 32 of the NodeB can be configured to compute the HS-SCCH order 23 based on the desired activation status 33 and Eq. 1 and Eq. 2. Alternatively the NodeB may be adapted to compute the Table 1 or the Table 2 at some earlier point in time, e.g. at set-up time, using the equations Eq. 1 and Eq. 2 and the order mapping function 32 may be configured to perform normal lookup table operations using the pre-computed table. Yet another alternative is that a table corresponding to the order mapping is pre-computed externally to the NodeB and then loaded into the NodeB e.g. at set-up time. Similarly the UE may be configured to compute the order mapping to be applied using the equations Eq. 1 and Eq. 2, which may be preconfigured in the UE or may be transmitted to the UE at set-up time e.g. from a management control node.

With the HS-SCCH order mapping presented in Table 1 and Table 2 the UE can utilize the order type and order bits as a pointer for where in the table the carrier activation status corresponding to a received HS-SCCH order can be found.

This can be achieved by applying the following: bin2dec($x_{ord}$)−8+z, where bin2dec represents binary-to-decimal conversion and z denotes the position of the carrier activation status corresponding to the $x_{ord}$='001000'. This is assuming that the HS-SCCH order mapping according to the Table 1 or Table 2 is stored in a data structure in a memory of the UE. Then z is a reference point, such as a memory address indicating the first entry, i.e. the first pair of corresponding HS-SCCH order and desired activation status, of the data structure.

To exemplify, consider a scenario in which the UE has 4 downlink carriers and 2 uplink carriers configured and where the NodeB is supposed to order the UE to activate all of its secondary downlink carriers and deactivate the secondary uplink carrier, i.e. $D_2=D_3=D_4=1$, $U_2=0$ and $U_3=U_4=0$ (since these carriers are not configured). Applying equation Eq. 1 gives V=1+0+3+6+0−0=10. By using equation Eq. 2 this results in $x_{ord}$=dec2bin(10+8)='010010'. Similarly, upon receiving the HS-SCCH order the UE computes bin2dec (010010)−8+z=10+z. This suggest that the UE can find the activation status corresponding to the received HS-SCCH order 10 entries after the first HS-SCCH order used for activation/and deactivation located at entry z.

Other embodiments of the invention may utilize alternative HS-SCCH order mappings that arise from that:

$U_i$ is replaced with $U_iD_i$ in equation Eq. 1. The reason for this change is to assert that each active uplink carrier has a corresponding active downlink carrier. Thus the order mapping function 32 of FIG. 3 would in this case only account for the activation status of a certain secondary uplink carrier $U_i$ if its corresponding downlink carrier is active, i.e. $D_i=1$.

$D_3$ and $D_4$ are interchanged in equation Eq. 1. This operation results in that the order mapping $x_{odt,1}x_{odt,2}x_{odt,3}$, $x_{ord,1}x_{ord,2}x_{ord,3}$='001101' would describe the situation where $D_2=D_4=U_2=1$, $D_3.=U_3=U_4=0$ whereas the order mapping $x_{odt,1}x_{odt,2}x_{odt,3}, x_{ord,1}x_{ord,2}x_{ord,3}$='010001' instead describes the situation where $D_2=D_3=U_2=1$, $D_4.=U_3=U_4=0$. In other words, the rows describing the 'carrier activation status' where only one of $D_3$ and $D_4$ are one have been interchanged in Table 1 and Table 2. This is illustrated in Table 3 and it can be can generated with the following equation $$V=D_2+U_2+3D_4+6D_3+9U_4+15U_3-18U_4U_3+(1-D_3)(1-U_4)(D_4+D_2U_2-D_4U_2-D_4D_2)(-1+D_2+U_2) \quad \text{Eq. 3}$$

The corresponding table for the 4-carrier HSDPA case, i.e. $U_3$ and $U_4$ always 0, is shown in Table 5. For actual encoding of order type bits and order bits, equation Eq. 2 still applies. Similarly as above the UE can utilize the order type and order bits to derive a pointer (using the same expression as above, i.e. bin2dec($x_{ord}$)−8+z) for where in a table the carrier activation status corresponding to the order can be found.

$U_3$ and $U_4$ are interchanged in equation Eq. 1 simultaneously as $D_3$ and $D_4$ are interchanged. Table 4 illustrates the mapping that corresponds to the scenario where $U_3$ and $U_4$ are interchanged simultaneously as $D_3$ and $D_4$ are interchanged. That is the table can be created by following equation $$V=(D_2+U_2)+3D_4+6(U_3+D_3)+15U_4-9U_3U_4+(1-D_3)(1-U_4)(D_4+D_2U_2-D_4U_2-D_4D_2)(-1+D_2+U_2) \quad \text{Eq. 4}$$

The corresponding table for the 4-carrier HSDPA case (i.e. $U_3$ and $U_4$ always 0) is shown in Table 5. For actual encoding of order type bits and order bits, equation Eq. 2 still applies. Similarly as above the UE can utilize the order type and order bits to derive a pointer (using the same expression as above, i.e. bin2dec($x_{ord}$)−8+z) for where in a table the carrier activation status corresponding to the order can be found.

Based on the HS-SCCH order mappings presented herein, different embodiments may be provided as methods in radio base stations (NodeBs) and user equipments as well as apparatuses (i.e. radio base stations and user equipments) as will be further explained along with FIGS. 4-7.

Note that the HS-SCCH order mappings described herein support both NodeB implementations using traditional pure lookup tables as well as NodeB implementations performing encoding by computing order type and order bits based on equations Eq. 1, Eq. 3 or Eq. 4 in combination with equation Eq. 2.

Similarly, the HS-SCCH order mappings described herein support both UE implementations using traditional pure lookup table operations as well as UE implementations where the UE determines the secondary carrier activation status from a received HS-SCCH order without having to walk through an entire table of possible received order types and order bits.

Figure 4:
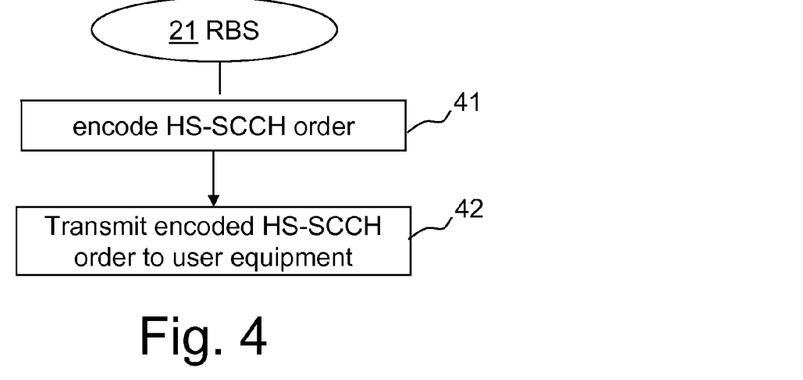
FIG. 4 is a flow diagram illustrating an embodiment of a method in radio base station for signal interaction with a user equipment configured for multi-carrier operation.

FIG. 4 is a flow diagram illustrating an embodiment of a method in radio base station 21 for signal interaction with a user equipment configured for multi-carrier operation on a set of carriers. The set of carriers includes two or three secondary downlink carriers.

In a step 41a HS-SCCH order is encoded. The HS-SCCH order comprises a number of bits. According to the current 3GPP standard those bits are referred to as order type bits and order bits as mentioned above. The order type bits and order bits may be encoded according to any of Tables 1-5 as discussed above. This may be achieved by a lookup table operation. Alternatively the order type bits and order bits may be computed from a decimal-to-binary conversion of a function of a variable V, wherein V is a function of a desired activation status of the secondary downlink carriers and of any configured secondary uplink carriers. When computing the variable V, the desired activation status of a secondary carrier is represented by 1 if the secondary carrier is activated for the user equipment and represented by 0 if the secondary carrier is not activated or not configured for the user equipment. V may e.g. be computed using equations Eq. 1, Eq. 3 or Eq. 4 as described above and the HS-SCCH order may be computed using equation Eq. 2. However it may be possible to use other equivalent equations and functions depending on other requirements, such as backward compatibility. It is e.g. possible to add a constant 8 to the equations Eq. 1, Eq. 3 and Eq. 4 and subtract a constant 8 from the equation Eq. 2 and arrive at the same order mapping as in Tables 1-5 respectively. The equations Eq. 1-4 have the advantage that they allow for backward compatibility as mentioned above and allow for simplified operations in the UE as described above.

It is to be noted that even if the RBS 21 performs the encoding in step 41 by means of a lookup table operation and does not in fact compute the order type bits and order bits as described above, it is still advantageous to encode the HS-SCCH order according to an order mapping that allows for computation of the HS-SCCH order. If an order mapping is used that makes the HS-SCCH order computable from the desired activation status, this allows for the UE to compute the order mapping to be used for interpreting the HS-SCCH order.

In a step 42, the HS-SCCH order that was encoded in the step 41 is transmitted to the user equipment as illustrated in FIG. 4.

Figure 5:
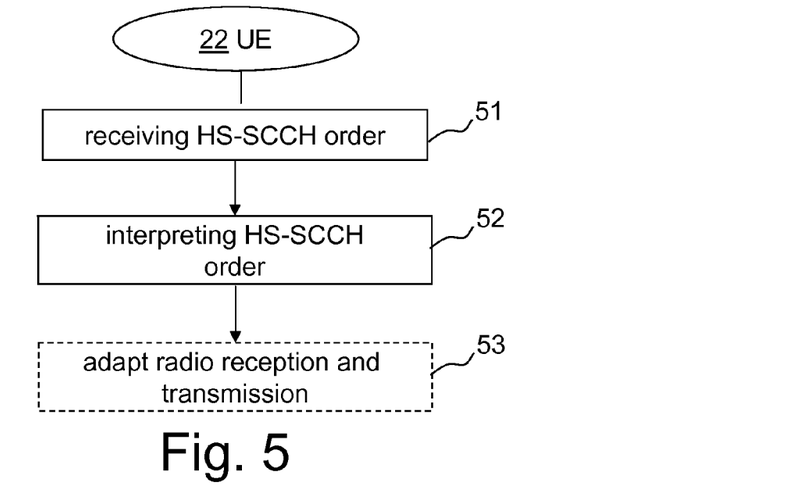
FIG. 5 is a flow diagram illustrating an embodiment of a method of receiving and processing an HS-SCCH order in a user equipment configured for multi-carrier operation.

FIG. 5 is a flow diagram illustrating an embodiment of a method in a user equipment 22 configured for multi-carrier operation on a set of carriers including two or three secondary downlink carriers. In a step 51 the UE 22 receives an HS-SCCH, order from the radio base station 21. The HS-SCCH order is encoded according to any of the alternatives described above for the step 41. In a step 52 the received HS-SCCH order is interpreted. The interpretation of the HS-SCCH order may be carried out in different alternative ways. The interpretation may be carried out by looking up the desired activation status of the set of carriers in a data structure stored in the user equipment, where the data structure maps the order type bits and the order bits of the received HS-SCCH order to the desired activation status. The data structure may correspond to any of the Tables 1-5 below. It is also possible that the UE computes a data structure corresponding to the order mapping based on e.g. equations Eq. 1, Eq. 3 or Eq. 4 in combination with equation Eq. 2 and thereafter performs the lookup operation to interpret the HS-SCCH order. The lookup operation may be carried out by matching order type bits and order bits of the received HS-SCCH order with order type bits and order bits associated with entries in the data structure to identify the appropriate entry. It is possible that several matching attempts are required before finding the appropriate entry which consumes processing resources. Alternatively, as mentioned above, the lookup operation may be simplified by deriving a pointer to the entry that corresponds to the HS-SCCH order. The pointer may be derived by utilizing the order type bits and order bits of the received HS-SCCH order. In particular, if the HS-SCCH order has been encoded as described above in connection with FIG. 4, the pointer may be derived by computing the variable V and setting the pointer to indicate the entry that is located V entries after a first entry of the data structure that maps the order type bits and the order bits to the desired activation status. As mentioned above, the pointer could be derived as $p=bin2dec(x_{ord})-8+z$, where p denotes the pointer, z denotes the data structure entry corresponding to $x_{ord}=$'001000' if the order mapping that is used is one of those indicated by any of Tables 1-5 below.

Typically radio reception and transmission operation in the user equipment is adapted to account for secondary carrier activation status as indicated by the received HS-SCCH order. Accordingly an optional step 53 of adapting radio reception and transmission is illustrated in FIG. 5.

Figure 6:
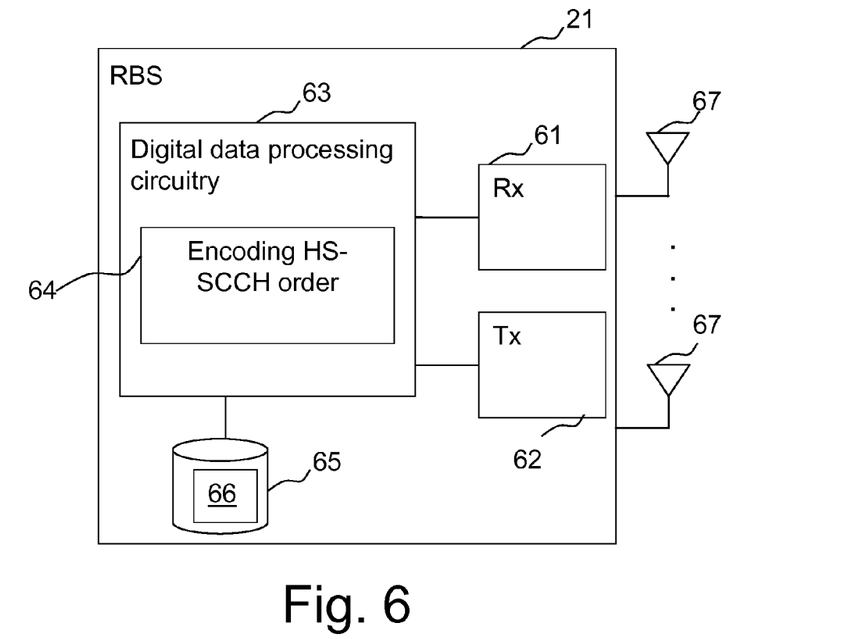
FIG. 6 is a schematic block diagram illustrating an embodiment of a radio base station configured for use in a multi-carrier communication system.

FIG. 6 is a schematic block diagram illustrating an embodiment of the radio base station (RBS) 21 configured for use in a multi-carrier communication system. The RBS 21 is adapted to perform the method according to FIG. 4. As illustrated in FIG. 6, the RBS 21 comprises a receiver 61 and a transmitter 62. Alternatively the receiver 61 and transmitter 62 may be integrated in a transceiver unit. The transmitter 62 is particularly configured to perform the step 42 of FIG. 4. The radio base station also comprises a number of antennas 67 and digital data processing circuitry 63. The digital data processing circuitry 63 is particularly adapted to encode an HS-SCCH order according to the step 41 of FIG. 4 described above. The digital data processing circuitry 63 may be embodied the form of one or more conventional programmable processors programmed to perform the associated processing. However, any digital data processing circuitry capable of performing said processing could be used, e.g. an ASIC, a FPGA etc. It is also possible to use a combination of different kinds of digital data processing circuitry. In embodiments of the invention using programmable devices, the controlling computer program (software) is embodied as machine-readable instructions stored on some kind of computer-readable medium such as e.g. RAM, electronic read-only memory etc. Programmable devices performing processing according to the embodiments described herein can be dedicated to this task or used also for processing relating to other tasks. In FIG. 6 it is illustrated that the digital data processing circuitry 63 includes a submodule 64 for encoding the HS-SCCH order. The submodule 64 may e.g. be a software submodule comprising machine-readable instructions that cause the RBS 21 to perform the method illustrated in FIG. 4 when executed. The RBS 21 may also include a memory 65. The memory 65 may e.g. store the HS-SCCH order mapping in the form of a data structure 66, which is to be used to encode the HS-SCCH order. Alternatively or additionally equations that are to be used for computing the encoded HS-SCCH can be stored in the memory 66.

Figure 7:
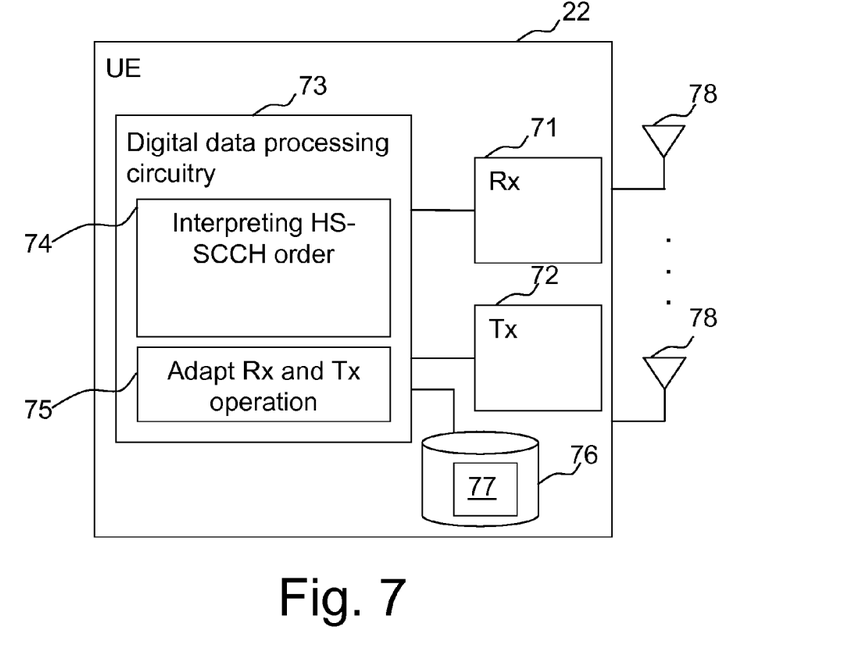
FIG. 7 is a schematic block diagram illustrating an embodiment of a user equipment configured for multi-carrier operation.

FIG. 7 is a schematic block diagram illustrating an embodiment of a user equipment (UE) 22 configured for multi-carrier operation. The UE 22 is adapted to perform the method according to FIG. 5. As illustrated in FIG. 7, the UE 22 comprises a receiver 71 and a transmitter 72. Alternatively the receiver 71 and transmitter 72 may be integrated in a transceiver unit. The receiver 71 is particularly configured to perform the step 51 of FIG. 5. The UE 22 also comprises one or more antennas 78 and digital data processing circuitry 73. The digital data processing circuitry 73 is particularly adapted to interpret a received HS-SCCH order according to the step 52 of FIG. 5 described above. The digital data processing circuitry 73 may be embodied the form of one or more conventional programmable processors programmed to perform the associated processing. However, any digital data processing circuitry capable of performing said processing could be used, e.g. an ASIC, a FPGA etc. It is also possible to use a combination of different kinds of digital data processing circuitry. In embodiments of the invention using programmable devices, the controlling computer program (software) is embodied as machine-readable instructions stored on some kind of computer-readable medium such as e.g. RAM, electronic read-only memory etc. Programmable devices performing processing according to the embodiments described herein can be dedicated to this task or used also for processing relating to other tasks. In FIG. 7 it is illustrated that the digital data processing circuitry 73 includes a submodule 74 for interpreting the HS-SCCH order according to the step 52 and a submodule 75 for adapting the operation of the receiver 71 and transmitter 72 in accordance with the interpreted HS-SCCH order, according to the optional step 53. The submodules 74 and 75 may e.g. be software submodules comprising machine-readable instructions that cause the UE 22 to perform the steps 52 and 53 respectively when executed. The UE 22 may also include a memory 76. The memory 76 may e.g. store the HS-SCCH order mapping in the form of a data structure 77, which is to be used for interpreting the received HS-SCCH order. Alternatively or additionally equations that may be used for computing the applicable HS-SCCH order mapping can be stored in the memory 76.

From the description above it is apparent that an advantage of some of the embodiments described herein is that by using an order mapping according to the embodiments described above radio base stations, such as Node Bs, may compute the order type and order bits of an HS-SCCH order based on the desired activation status of the secondary downlink and uplink carriers. This may make the use of HS-SCCH orders more efficient. The radio base stations may e.g. not be required to store large lookup tables which may save memory space and time since lookup operations in large lookup tables may be time consuming.

Another advantage of some of the embodiments described herein is that UEs can use the order type and order bits as a pointer for finding the corresponding desired activation status in a data structure when interpreting a received HS-SCCH order. This will put less computational burden on the UE when mapping the received HS-SCCH order to the corresponding desired activation status.

Yet another advantage of some of the embodiments described herein is that backward compatibility is retained with 3GPP Rel-8 and Rel-9.

A further advantage of certain of the embodiments described herein is that forward compatibility with a scenario where up to 4 downlink carriers and up to 4 uplink carriers are configured is enabled.

Yet a further advantage of certain of the embodiments described herein is that only consecutive order types and order bits are used. This applies both for embodiments in which up to 4 downlink carriers are configured with up to 2 uplink carriers as well as for embodiments in which up to 4 downlink carriers are configured with up to 4 uplink carriers. This property will help ensuring that the available HS-SCCH orders are used in an efficient manner, i.e. without fragmenting available code words.

In the drawings and specification, there have been disclosed typical preferred embodiments of the invention and, although specific terms are employed, they are used in a generic and descriptive sense only and not for purposes of limitation, the scope of the invention being set forth in the following claims.

Tables:

TABLE 1

| | Carrier activation status | | | | | | HS-SCCH order information | | | | | |
| --- | --- | --- | --- | --- | --- | --- | --- | --- | --- | --- | --- | --- |
| | Downlink | | | Uplink | | | Order type bits | | | Order bits | | |
| Case | $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 1 | 0 | 0 | 0 | 0 | 0 | 0 | | 001 | | 0 | 0 | 0 |
| 2 | 0 | 0 | 1 | 0 | 0 | 0 | | | | 0 | 0 | 1 |
| 3 | 0 | 1 | 0 | 0 | 0 | 0 | | | | 0 | 1 | 0 |
| 4 | 0 | 0 | 1 | 0 | 0 | 1 | | | | 0 | 1 | 1 |
| 5 | 0 | 1 | 1 | 0 | 0 | 0 | | | | 1 | 0 | 0 |
| 6 | 0 | 1 | 1 | 0 | 0 | 1 | | | | 1 | 0 | 1 |
| 7 | 1 | 0 | 0 | 0 | 0 | 0 | | | | 1 | 1 | 0 |
| 8 | 1 | 0 | 1 | 0 | 0 | 0 | | | | 1 | 1 | 1 |
| 9 | 1 | 0 | 1 | 0 | 0 | 1 | | 010 | | 0 | 0 | 0 |
| 10 | 1 | 1 | 0 | 0 | 0 | 0 | | | | 0 | 0 | 1 |
| 11 | 1 | 1 | 1 | 0 | 0 | 0 | | | | 0 | 1 | 0 |
| 12 | 1 | 1 | 1 | 0 | 0 | 1 | | | | 0 | 1 | 1 |

TABLE 2

| | Carrier activation status | | | | | | HS-SCCH order information | | | | | |
| --- | --- | --- | --- | --- | --- | --- | --- | --- | --- | --- | --- | --- |
| | Downlink | | | Uplink | | | Order type bits | | | Order bits | | |
| Case | $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 1 | 0 | 0 | 0 | 0 | 0 | 0 | | 001 | | 0 | 0 | 0 |
| 2 | 0 | 0 | 1 | 0 | 0 | 0 | | | | 0 | 0 | 1 |
| 3 | 0 | 1 | 0 | 0 | 0 | 0 | | | | 0 | 1 | 0 |
| 4 | 0 | 0 | 1 | 0 | 0 | 1 | | | | 0 | 1 | 1 |
| 5 | 0 | 1 | 1 | 0 | 0 | 0 | | | | 1 | 0 | 0 |
| 6 | 0 | 1 | 1 | 0 | 0 | 1 | | | | 1 | 0 | 1 |
| 7 | 1 | 0 | 0 | 0 | 0 | 0 | | | | 1 | 1 | 0 |
| 8 | 1 | 0 | 1 | 0 | 0 | 0 | | | | 1 | 1 | 1 |
| 9 | 1 | 0 | 1 | 0 | 0 | 1 | | 010 | | 0 | 0 | 0 |
| 10 | 1 | 1 | 0 | 0 | 0 | 0 | | | | 0 | 0 | 1 |
| 11 | 1 | 1 | 1 | 0 | 0 | 0 | | | | 0 | 1 | 0 |
| 12 | 1 | 1 | 1 | 0 | 0 | 1 | | | | 0 | 1 | 1 |
| 13 | 1 | 0 | 0 | 1 | 0 | 0 | | 010 | | 1 | 0 | 0 |
| 14 | 1 | 0 | 1 | 1 | 0 | 0 | | | | 1 | 0 | 1 |
| 15 | 1 | 0 | 1 | 1 | 0 | 1 | | | | 1 | 1 | 0 |
| 16 | 1 | 1 | 0 | 1 | 0 | 0 | | | | 1 | 1 | 1 |
| 17 | 1 | 1 | 1 | 1 | 0 | 0 | | 011 | | 0 | 0 | 0 |
| 18 | 1 | 1 | 1 | 1 | 0 | 1 | | | | 0 | 0 | 1 |
| 19 | 0 | 1 | 0 | 0 | 1 | 0 | | | | 0 | 1 | 0 |
| 20 | 0 | 1 | 1 | 0 | 1 | 0 | | | | 0 | 1 | 1 |
| 21 | 0 | 1 | 1 | 0 | 1 | 1 | | | | 1 | 0 | 0 |
| 22 | 1 | 1 | 0 | 1 | 1 | 0 | | | | 1 | 0 | 1 |
| 23 | 1 | 1 | 1 | 1 | 1 | 0 | | | | 1 | 1 | 0 |
| 24 | 1 | 1 | 1 | 1 | 1 | 1 | | | | 1 | 1 | 1 |
| 25 | 1 | 1 | 0 | 0 | 1 | 0 | | 100 | | 0 | 0 | 0 |
| 26 | 1 | 1 | 1 | 0 | 1 | 0 | | | | 0 | 0 | 1 |
| 27 | 1 | 1 | 1 | 0 | 1 | 1 | | | | 0 | 1 | 0 |

TABLE 3

| Case | Carrier activation status | | | | | | HS-SCCH order information | | | | | |
|---|---|---|---|---|---|---|---|---|---|---|---|---|
| | Downlink | | | Uplink | | | Order type bits | | | Order bits | | |
| | $D_4$ | $D_3$ | $D_2$ | $U_4$ | $U_3$ | $U_2$ | $x_{odt,1}$ | $x_{odt,2}$ | $x_{odt,.3}$ | $x_{ord,1}$ | $x_{ord,2}$ | $x_{ord,3}$ |
| 1 | 0 | 0 | 0 | 0 | 0 | 0 | 001 | | | 0 | 0 | 0 |
| 2 | 0 | 0 | 1 | 0 | 0 | 0 | | | | 0 | 0 | 1 |
| 3 | 1 | 0 | 0 | 0 | 0 | 0 | | | | 0 | 1 | 0 |
| 4 | 0 | 0 | 1 | 0 | 0 | 1 | | | | 0 | 1 | 1 |
| 5 | 1 | 0 | 1 | 0 | 0 | 0 | | | | 1 | 0 | 0 |
| 6 | 1 | 0 | 1 | 0 | 0 | 1 | | | | 1 | 0 | 1 |
| 7 | 0 | 1 | 0 | 0 | 0 | 0 | | | | 1 | 1 | 0 |
| 8 | 0 | 1 | 1 | 0 | 0 | 0 | | | | 1 | 1 | 1 |
| 9 | 0 | 1 | 1 | 0 | 0 | 1 | 010 | | | 0 | 0 | 0 |
| 10 | 1 | 1 | 0 | 0 | 0 | 0 | | | | 0 | 0 | 1 |
| 11 | 1 | 1 | 1 | 0 | 0 | 0 | | | | 0 | 1 | 0 |
| 12 | 1 | 1 | 1 | 0 | 0 | 1 | | | | 0 | 1 | 1 |
| 13 | 1 | 0 | 0 | 1 | 0 | 0 | 010 | | | 1 | 0 | 0 |
| 14 | 1 | 0 | 1 | 1 | 0 | 0 | | | | 1 | 0 | 1 |
| 15 | 1 | 0 | 1 | 1 | 0 | 1 | | | | 1 | 1 | 0 |
| 16 | 1 | 1 | 0 | 1 | 1 | 0 | | | | 1 | 1 | 1 |
| 17 | 1 | 1 | 1 | 1 | 1 | 0 | 011 | | | 0 | 0 | 0 |
| 18 | 1 | 1 | 1 | 1 | 1 | 1 | | | | 0 | 0 | 1 |
| 19 | 1 | 1 | 0 | 1 | 0 | 0 | | | | 0 | 1 | 0 |
| 20 | 1 | 1 | 1 | 1 | 0 | 0 | | | | 0 | 1 | 1 |
| 21 | 1 | 1 | 1 | 1 | 0 | 1 | | | | 1 | 0 | 0 |
| 22 | 0 | 1 | 0 | 0 | 1 | 0 | | | | 1 | 0 | 1 |
| 23 | 0 | 1 | 1 | 0 | 1 | 0 | | | | 1 | 1 | 0 |
| 24 | 0 | 1 | 1 | 0 | 1 | 1 | | | | 1 | 1 | 1 |
| 25 | 1 | 1 | 0 | 0 | 1 | 0 | 100 | | | 0 | 0 | 0 |
| 26 | 1 | 1 | 1 | 0 | 1 | 0 | | | | 0 | 0 | 1 |
| 27 | 1 | 1 | 1 | 0 | 1 | 1 | | | | 0 | 1 | 0 |

TABLE 4

| Case | Carrier activation status | | | | | | HS-SCCH order information | | | | | |
|---|---|---|---|---|---|---|---|---|---|---|---|---|
| | Downlink | | | Uplink | | | Order type bits | | | Order bits | | |
| | $D_4$ | $D_3$ | $D_2$ | $U_4$ | $U_3$ | $U_2$ | $x_{odt,1}$ | $x_{odt,2}$ | $x_{odt,.3}$ | $x_{ord,1}$ | $x_{ord,2}$ | $x_{ord,3}$ |
| 1 | 0 | 0 | 0 | 0 | 0 | 0 | 001 | | | 0 | 0 | 0 |
| 2 | 0 | 0 | 1 | 0 | 0 | 0 | | | | 0 | 0 | 1 |
| 3 | 1 | 0 | 0 | 0 | 0 | 0 | | | | 0 | 1 | 0 |
| 4 | 0 | 0 | 1 | 0 | 0 | 1 | | | | 0 | 1 | 1 |
| 5 | 1 | 0 | 1 | 0 | 0 | 0 | | | | 1 | 0 | 0 |
| 6 | 1 | 0 | 1 | 0 | 0 | 1 | | | | 1 | 0 | 1 |
| 7 | 0 | 1 | 0 | 0 | 0 | 0 | | | | 1 | 1 | 0 |
| 8 | 0 | 1 | 1 | 0 | 0 | 0 | | | | 1 | 1 | 1 |
| 9 | 0 | 1 | 1 | 0 | 0 | 1 | 010 | | | 0 | 0 | 0 |
| 10 | 1 | 1 | 0 | 0 | 0 | 0 | | | | 0 | 0 | 1 |
| 11 | 1 | 1 | 1 | 0 | 0 | 0 | | | | 0 | 1 | 0 |
| 12 | 1 | 1 | 1 | 0 | 0 | 1 | | | | 0 | 1 | 1 |
| 13 | 0 | 1 | 0 | 0 | 1 | 0 | 010 | | | 1 | 0 | 0 |
| 14 | 0 | 1 | 1 | 0 | 1 | 0 | | | | 1 | 0 | 1 |
| 15 | 0 | 1 | 1 | 0 | 1 | 1 | | | | 1 | 1 | 0 |
| 16 | 1 | 1 | 0 | 0 | 1 | 0 | | | | 1 | 1 | 1 |
| 17 | 1 | 1 | 1 | 0 | 1 | 0 | 011 | | | 0 | 0 | 0 |
| 18 | 1 | 1 | 1 | 0 | 1 | 1 | | | | 0 | 0 | 1 |
| 19 | 1 | 0 | 0 | 1 | 0 | 0 | | | | 0 | 1 | 0 |
| 20 | 1 | 0 | 1 | 1 | 0 | 0 | | | | 0 | 1 | 1 |
| 21 | 1 | 0 | 1 | 1 | 0 | 1 | | | | 1 | 0 | 0 |
| 22 | 1 | 1 | 0 | 1 | 1 | 0 | | | | 1 | 0 | 1 |
| 23 | 1 | 1 | 1 | 1 | 1 | 0 | | | | 1 | 1 | 0 |
| 24 | 1 | 1 | 1 | 1 | 1 | 1 | | | | 1 | 1 | 1 |
| 25 | 1 | 1 | 0 | 1 | 0 | 0 | 100 | | | 0 | 0 | 0 |
| 26 | 1 | 1 | 1 | 1 | 0 | 0 | | | | 0 | 0 | 1 |
| 27 | 1 | 1 | 1 | 1 | 0 | 1 | | | | 0 | 1 | 0 |

TABLE 5

| Case | Carrier activation status ||||||  HS-SCCH order information |||||| 
| | Downlink ||| Uplink ||| Order type bits ||| Order bits |||
| | $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
|---|---|---|---|---|---|---|---|---|---|---|---|---|
| 1 | 0 | 0 | 0 | 0 | 0 | 0 | | 001 | | 0 | 0 | 0 |
| 2 | 0 | 0 | 1 | 0 | 0 | 0 | | | | 0 | 0 | 1 |
| 3 | 1 | 0 | 0 | 0 | 0 | 0 | | | | 0 | 1 | 0 |
| 4 | 0 | 0 | 1 | 0 | 0 | 1 | | | | 0 | 1 | 1 |
| 5 | 1 | 0 | 1 | 0 | 0 | 0 | | | | 1 | 0 | 0 |
| 6 | 1 | 0 | 1 | 0 | 0 | 1 | | | | 1 | 0 | 1 |
| 7 | 0 | 1 | 0 | 0 | 0 | 0 | | | | 1 | 1 | 0 |
| 8 | 0 | 1 | 1 | 0 | 0 | 0 | | | | 1 | 1 | 1 |
| 9 | 0 | 1 | 1 | 0 | 0 | 1 | | 010 | | 0 | 0 | 0 |
| 10 | 1 | 1 | 0 | 0 | 0 | 0 | | | | 0 | 0 | 1 |
| 11 | 1 | 1 | 1 | 0 | 0 | 0 | | | | 0 | 1 | 0 |
| 12 | 1 | 1 | 1 | 0 | 0 | 1 | | | | 0 | 1 | 1 |

What is claimed is:

1. A method in a radio base station for signal interaction with a user equipment configured for multi carrier operation on a set of carriers including two or three secondary downlink carriers, wherein the method comprises:

encoding a High-Speed Shared Control Channel (HS-SCCH) order comprising order type bits and order bits, by encoding the order type bits and order bits to be computable from a decimal-to-binary conversion of a function of a variable V, wherein V is a function of a desired activation status of the secondary downlink carriers and of any secondary uplink carrier of said set of carriers, and wherein the desired activation status of a secondary carrier is represented by 1 if the secondary carrier is activated for the user equipment and represented by 0 if the secondary carrier is not activated or not configured for the user equipment; and transmitting the encoded HS-SCCH order to the user equipment;

wherein $$V=(D_2+U_2)+3D_3+6(U_4+D_4)+15U_3-9U_3U_4+(1-D_4)(1-U_3)(D_3+D_2U_2-D_3U_2-D_3D_2)(-1+D_2+U_2)$$

or $$V=D_2+U_2+3D_4+6D_3+9U_4+15U_3-18U_4U_3+(1-D_3)(1-U_4)(D_4+D_2U_2-D_4U_2-D_4D_2)(-1+D_2+U_2)$$

or $$V=(D_2+U_2)+3D_4+6(U_3+D_3)+15U_4-9U_3U_4+(1-U_4)(D_4+D_2U_2-D_4U_2-D_4D_2)(-1+D_2+U_2)$$

wherein parameters $D_k$ and $U_l$ represent the desired activation status of downlink secondary carrier k and uplink secondary carrier l, respectively; and wherein $D_k=1$ indicates that secondary downlink carrier k is activated for the user equipment;

$D_k=0$ indicates that secondary downlink carrier k is not activated or not configured for the user equipment;

$U_l=1$ indicates that secondary uplink carrier l is activated for the user equipment; and $U_l=0$ indicates that secondary uplink carrier l is not activated or not configured for the user equipment.

2. The method according to claim 1, wherein the HS-SCCH order comprises three order type bits $x_{odt,1}$, $x_{odt,2}$ and $x_{odt,3}$, and three order bits $x_{ord,1}$, $x_{ord,2}$ and $x_{ord,3}$, wherein the three order type bits and the three order bits are encoded according to an order mapping embodied within the table:

| Carrier activation status |||||| HS-SCCH order ||||||
| Order type bits ||| Order bits |||
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
|---|---|---|---|---|---|---|---|---|---|---|---|
| 0 | 0 | 0 | 0 | 0 | 0 | | 001 | | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 1 | 0 | 0 | 0 | | | | 1 | 1 | 1 |
| 1 | 0 | 1 | 0 | 0 | 1 | | 010 | | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 | and wherein $D_k=1$ indicates that secondary downlink carrier k is activated for the user equipment;

$D_k=0$ indicates that secondary downlink carrier k is not activated or not configured for the user equipment;

$U_l=1$ indicates that secondary uplink carrier l is activated for the user equipment; and $U_l=0$ indicates that secondary uplink carrier l is not activated or not configured for the user equipment.

3. The method according to claim 1, wherein said function of the variable V is V+8.

4. The method according to claim 1, wherein said set of carriers includes no more than three secondary downlink carriers and no more than a single secondary uplink carrier.

5. A method in a user equipment for signal interaction with a radio base station, wherein said user equipment is configured for multi carrier operation on a set of carriers including two or three secondary downlink carriers, wherein the method comprises:

receiving a High-Speed Shared Control Channel (HS-SCCH) order from the radio base station, said HS-SCCH order comprising order type bits and order bits encoded such that the order type bits and order bits are computable from a decimal-to-binary conversion of a function of a variable V, wherein V is a function of a desired activation status of the secondary downlink carriers and of any secondary uplink carrier of said set of carriers, and wherein the desired activation status of a secondary carrier is represented by 1 if the secondary carrier is activated for the user equipment and represented by 0 if the secondary carrier is not activated or not configured for the user equipment; and interpreting the received HS-SCCH order to identify the desired activation status of the set of carriers;

wherein $$V=(D_2+U_2)+3D_3+6(U_4+D_4)+15U_3-9U_3U_4+(1-D_4)(1-U_3)(D_3+D_2U_2-D_3U_2-D_3D_2)(-1+D_2+U_2)$$

or $$V=D_2+U_2+3D_4+6D_3+9U_4+15U_3-18U_4U_3+(1-D_3)(1-U_4)(D_4+D_2U_2-D_4U_2-D_4D_2)(-1+D_2+U_2)$$

or $$V=(D_2+U_2)+3D_4+6(U_3+D_3)+15U_4-9U_3U_4+(1-D_3)(1-U_4)(D_4+D_2U_2-D_4U_2-D_4D_2)(-1+D_2+U_2)$$

wherein parameters $D_k$ and $U_l$ represent the desired activation status of downlink secondary carrier k and uplink secondary carrier l, respectively; and wherein $D_k=1$ indicates that secondary downlink carrier k is activated for the user equipment;

$D_k=0$ indicates that secondary downlink carrier k is not activated or not configured for the user equipment;

$U_l=1$ indicates that secondary uplink carrier l is activated for the user equipment; and $U_l=0$ indicates that secondary uplink carrier l is not activated or not configured for the user equipment.

6. The method according to claim 5, wherein said interpreting comprises using the order type bits and order bits of the received HS-SCCH order to look up the desired activation status of the set of carriers in a data structure stored in the user equipment, said data structure mapping the order type bits and the order bits to the desired activation status.

7. The method according to claim 6, wherein the HS-SCCH order comprises three order type bits $x_{odt,1}$, $x_{odt,2}$ and $x_{odt,3}$, and three order bits, $x_{ord,1}$, $x_{ord,2}$ and $x_{ord,3}$, wherein the data structure maps the order type bits and the order bits to the desired activation status according to the table:

| Carrier activation status | | | | | | HS-SCCH order | | | | | |
|---|---|---|---|---|---|---|---|---|---|---|---|
| | | | | | | Order type bits | | | Order bits | | |
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 0 | 0 | 0 | 0 | 0 | 0 | 001 | | | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 0 | 0 | 0 | 0 | | | | 1 | 1 | 1 |
| 1 | 0 | 1 | 0 | 0 | 1 | 010 | | | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 | and wherein $D_k=1$ indicates that secondary downlink carrier k is activated for the user equipment;

$D_k=0$ indicates that secondary downlink carrier k is not activated or not configured for the user equipment;

$U_l=1$ indicates that secondary uplink carrier l is activated for the user equipment; and $U_l=0$ indicates that secondary uplink carrier l is not activated or not configured for the user equipment.

8. The method according to claim 6, wherein said interpreting comprises identifying an entry in the data structure by deriving a pointer to the entry utilizing the order type bits and order bits of the received HS-SCCH order.

9. The method according to claim 8, wherein said pointer is derived by computing said variable V and setting the pointer to indicate the entry that is located V entries after a first entry of said data structure.

10. The method according to claim 8, wherein the HS-SCCH order comprises three order type bits $x_{odt,1}$, $x_{odt,2}$ and $x_{odt,3}$, and three order bits, $x_{ord,1}$, $x_{ord,2}$ and $x_{ord,3}$, and wherein said pointer is derived as $$p=\text{bin2dec}(x_{ord})-8+z,$$

where p denotes the pointer, bin2dec represents binary-to-decimal conversion, $x_{ord}=(x_{odt,1},x_{odt,2},x_{odt,3},x_{ord,1},x_{ord,2},x_{ord,3})$ and z denotes the data structure entry corresponding to $x_{ord}=$'001000'.

11. The method according to claim 6, wherein said interpreting comprises identifying an entry in the data structure by matching order type bits and order bits of the received HS-SCCH order with order type bits and order bits associated with entries in the data structure.

12. The method according to claim 5, further comprising adapting radio reception and transmission operation in the user equipment to account for secondary carrier activation status as indicated by the received HS-SCCH order.

13. The method according to claim 5, wherein said set of carriers includes no more than three secondary downlink carriers and no more than a single secondary uplink carrier.

14. A radio base station for signal interaction with a user equipment configured for multi carrier operation on a set of carriers including two or three secondary downlink carriers, said radio base station comprising:

digital data processing circuitry configured to encode a High-Speed Shared Control Channel (HS-SCCH) order comprising order type bits and order bits, by encoding the order type bits and order bits to be computable from a decimal-to-binary conversion of a function of a variable V, wherein V is a function of a desired activation status of the secondary downlink carriers and of any secondary uplink carrier of said set of carriers, and wherein the desired activation status of a secondary carrier is represented by 1 if the secondary carrier is activated for the user equipment and represented by 0 if the secondary carrier is not activated or not configured for the user equipment; and a transmitter configured to transmit the encoded HS-SCCH order to the user equipment;

wherein $$V=(D_2+U_2)+3D_3+6(U_4+D_4)+15U_3-9U_3U_4+(1-D_4)(1-U_3)(D_3+D_2U_2-D_3U_2-D_3D_2)(-1+D_2+U_2)$$

or $$V=D_2+U_2+3D_4+6D_3+9U_4+15U_3-18U_4U_3+(1-D_3)(1-U_4)(D_4+D_2U_2-D_4U_2-D_4D_2)(-1+D_2+U_2)$$

or $$V=(D_2+U_2)+3D_4+6(U_3+D_3)+15U_4-9U_3U_4+(1-D_3)(1-U_4)(D_4+D_2U_2-D_4U_2-D_4D_2)(-1+D_2+U_2)$$

wherein parameters $D_k$ and $U_l$ represent the desired activation status of downlink secondary carrier k and uplink secondary carrier l, respectively; and wherein
- $D_k=1$ indicates that secondary downlink carrier k is activated for the user equipment;
- $D_k=0$ indicates that secondary downlink carrier k is not activated or not configured for the user equipment;
- $U_l=1$ indicates that secondary uplink carrier l is activated for the user equipment; and
- $U_l=0$ indicates that secondary uplink carrier l is not activated or not configured for the user equipment.

15. The radio base station according to claim 14, wherein the digital data processing circuitry is configured to encode the HS-SCCH order to comprise three order type bits $x_{odt,1}$, $x_{odt,2}$ and $x_{odt,3}$, and three order bits $x_{ord,1}$, $x_{ord,2}$ and $x_{ord,3}$, wherein the digital data processing circuitry is configured to encode the three order type bits and the three order bits according to an order mapping embodied within the table:

| Carrier activation status | | | | | | HS-SCCH order | | | | | |
|---|---|---|---|---|---|---|---|---|---|---|---|
| | | | | | | Order type bits | | | Order bits | | |
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 0 | 0 | 0 | 0 | 0 | 0 | | 001 | | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 1 | 0 | 0 | 0 | | | | 1 | 1 | 1 |
| 1 | 0 | 1 | 0 | 0 | 1 | | 010 | | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 | and wherein
- $D_k=1$ indicates that secondary downlink carrier k is activated for the user equipment;
- $D_k=0$ indicates that secondary downlink carrier k is not activated or not configured for the user equipment;
- $U_l=1$ indicates that secondary uplink carrier l is activated for the user equipment; and
- $U_l=0$ indicates that secondary uplink carrier l is not activated or not configured for the user equipment.

16. The radio base station according to claim 14, wherein said function of the variable V is V+8.

17. The radio base station according to claim 14, wherein said set of carriers includes no more than three secondary downlink carriers and no more than a single secondary uplink carrier.

18. A user equipment configurable for multi carrier operation on a set of carriers including two or three secondary downlink carriers, said user equipment comprising:
- a radio transmitter;
- a radio receiver configured to receive a High-Speed Shared Control Channel (HS-SCCH) order from a radio base station, said HS-SCCH order comprising order type bits and order bits, said order type bits and order bits encoded such that the order type bits and order bits are computable from a decimal-to-binary conversion of a function of a variable V, wherein V is a function of a desired activation status of the secondary downlink carriers and of any secondary uplink carrier of said set of carriers, and wherein the desired activation status of a secondary carrier is represented by 1 if the secondary carrier is activated for the user equipment and represented by 0 if the secondary carrier is not activated or not configured for the user equipment; and
- digital data processing circuitry configured to interpret the received HS-SCCH order to identify the desired activation status of the set of carriers;

wherein $$V=(D_2+U_2)+3D_3+6(U_4+D_4)+15U_3-9U_3U_4+(1-D_4)(1-U_3)(D_3+D_2U_2-D_3U_2-D_3D_2)(-1+D_2+U_2)$$

or $$V=D_2+U_2+3D_4+6D_3+9U_4+15U_3-18U_4U_3+(1-D_3)(1-U_4)(D_4+D_2U_2-D_4U_2-D_4D_2)(-1+D_2+U_2)$$

or $$V=(D_2+U_2)+3D_4+6(U_3+D_3)+15U_4-9U_3U_4+(1-D_3)(1-U_4)(D_4+D_2U_2-D_4U_2-D_4D_2)(-1+D_2+U_2)$$

wherein parameters $D_k$ and $U_l$ represent the desired activation status of downlink secondary carrier k and uplink secondary carrier l, respectively; and wherein
- $D_k=1$ indicates that secondary downlink carrier k is activated for the user equipment;
- $D_k=0$ indicates that secondary downlink carrier k is not activated or not configured for the user equipment;
- $U_l=1$ indicates that secondary uplink carrier l is activated for the user equipment; and
- $U_l=0$ indicates that secondary uplink carrier l is not activated or not configured for the user equipment.

19. The user equipment according to claim 18, further comprising a memory configured to store a data structure that maps the order type bits and the order bits to the desired activation status, and wherein said digital data processing circuitry is configured to use the order type bits and order bits of the received HS-SCCH order to look up the desired activation status of the set of carriers in said data structure.

20. The user equipment according to claim 19, wherein the HS-SCCH order comprises three order type bits $x_{odt,1}$, $x_{odt,2}$ and $x_{odt,3}$, and three order bits $x_{ord,1}$, $x_{ord,2}$ and $x_{ord,3}$, wherein said data structure maps the order type bits and the order bits to the desired activation status according to the table:

| Carrier activation status | | | | | | HS-SCCH order | | | | | |
|---|---|---|---|---|---|---|---|---|---|---|---|
| | | | | | | Order type bits | | | Order bits | | |
| $D_4$ | $D_3$ | $D_2$ | $U_4$ | $U_3$ | $U_2$ | $x_{odt,1}$ | $x_{odt,2}$ | $x_{odt,3}$ | $x_{ord,1}$ | $x_{ord,2}$ | $x_{ord,3}$ |
| 0 | 0 | 0 | 0 | 0 | 0 | | 001 | | 0 | 0 | 0 |
| 0 | 0 | 1 | 0 | 0 | 0 | | | | 0 | 0 | 1 |
| 0 | 1 | 0 | 0 | 0 | 0 | | | | 0 | 1 | 0 |
| 0 | 0 | 1 | 0 | 0 | 1 | | | | 0 | 1 | 1 |
| 0 | 1 | 1 | 0 | 0 | 0 | | | | 1 | 0 | 0 |
| 0 | 1 | 1 | 0 | 0 | 1 | | | | 1 | 0 | 1 |
| 1 | 0 | 0 | 0 | 0 | 0 | | | | 1 | 1 | 0 |
| 1 | 0 | 1 | 0 | 0 | 0 | | | | 1 | 1 | 1 |
| 1 | 0 | 1 | 0 | 0 | 1 | | 010 | | 0 | 0 | 0 |
| 1 | 1 | 0 | 0 | 0 | 0 | | | | 0 | 0 | 1 |
| 1 | 1 | 1 | 0 | 0 | 0 | | | | 0 | 1 | 0 |
| 1 | 1 | 1 | 0 | 0 | 1 | | | | 0 | 1 | 1 | and wherein
- $D_k=1$ indicates that secondary downlink carrier k is activated for the user equipment;
- $D_k=0$ indicates that secondary downlink carrier k is not activated or not configured for the user equipment;
- $U_l=1$ indicates that secondary uplink carrier l is activated for the user equipment; and $U_l=0$ indicates that secondary uplink carrier l is not activated or not configured for the user equipment.

21. The user equipment according to claim 19, wherein said digital data processing circuitry is configured to identify an entry in the data structure by deriving a pointer to the entry utilizing the order type bits and order bits of the received HS-SCCH order, and wherein said data structure is stored in the memory to allow identification of an entry in the data structure by deriving a pointer to the entry utilizing the order type bits and order bits of the received HS-SCCH order.

22. The user equipment according to claim 21, wherein said digital data processing circuitry is configured to derive said pointer by computing said variable V and setting the pointer to indicate the entry that is located V entries after a first entry of said data structure.

23. The user equipment according to claim 21, wherein the HS-SCCH order comprises three order type bits $x_{odt,1}$, $x_{odt,2}$ and $x_{odt,3}$, and three order bits $x_{ord,1}$, $x_{ord,2}$ and $x_{ord,3}$, and wherein said digital data processing circuitry is configured to derive said pointer as $$p = \text{bin2dec}(x_{ord}) - 8 + z,$$

where p denotes the pointer, bin2dec represents binary-to-decimal conversion, $x_{ord} = (x_{odt,1}, x_{odt,2}, x_{odt,3}, x_{ord,1}, x_{ord,2}, x_{ord,3})$ and z denotes the data structure entry corresponding to $x_{ord} = \text{'001000'}$.

24. The user equipment according to claim 19, wherein said digital data processing circuitry is configured to identify an entry in the data structure by matching order type bits and order bits of the received HS-SCCH order with order type and order bits associated with entries in the data structure.

25. The user equipment according to claim 18, wherein said digital data processing circuitry is configured to adapt operation of the radio receiver and radio transmitter to account for secondary carrier activation status as indicated by the received HS-SCCH order.

26. The user equipment according to claim 18, wherein said set of carriers includes no more than three secondary downlink carriers and no more than a single secondary uplink carrier.

* * * * *